(12) United States Patent
Logue

(10) Patent No.: US 12,437,895 B2
(45) Date of Patent: Oct. 7, 2025

(54) IRRADIATION TARGETS FOR THE PRODUCTION OF RADIOISOTOPES AND DEBUNDLING TOOL FOR DISASSEMBLY THEREOF

(71) Applicant: BWXT Isotope Technology Group, Inc., Lynchburg, VA (US)

(72) Inventor: Evan Thomas Logue, Lynchburg, VA (US)

(73) Assignee: BWXT Isotope Technology Group, Inc., Lynchburg, VA (US)

( * ) Notice: Subject to any disclaimer, the term of this patent is extended or adjusted under 35 U.S.C. 154(b) by 110 days.

(21) Appl. No.: 17/843,626

(22) Filed: Jun. 17, 2022

(65) Prior Publication Data
US 2022/0406484 A1    Dec. 22, 2022

Related U.S. Application Data

(60) Provisional application No. 63/344,391, filed on May 20, 2022, provisional application No. 63/212,177, filed on Jun. 18, 2021.

(51) Int. Cl.
*G21K 5/08* (2006.01)
*G21G 1/02* (2006.01)
*G21G 1/00* (2006.01)

(52) U.S. Cl.
CPC .................. *G21K 5/08* (2013.01); *G21G 1/02* (2013.01); *G21G 2001/0036* (2013.01); *G21G 2001/0042* (2013.01)

(58) Field of Classification Search
CPC .... G21G 2001/0036; G21G 1/02; G21K 5/08; G21C 1/303; G21C 1/306; G21C 23/00; H05H 6/00

USPC ................ 376/186, 189, 202, 340, 341, 342
See application file for complete search history.

(56) References Cited

U.S. PATENT DOCUMENTS

| | | | |
|---|---|---|---|
| 7,526,058 | B2 | 4/2009 | Fawcett et al. |
| 8,576,972 | B2 | 11/2013 | Smith et al. |
| 9,899,107 | B2 | 2/2018 | Higgins et al. |
| 2009/0135989 | A1 | 5/2009 | Russell, II et al. |
| 2009/0274260 | A1 | 11/2009 | Russell, II et al. |
| 2011/0216868 | A1 | 9/2011 | Russell, II et al. |

(Continued)

FOREIGN PATENT DOCUMENTS

WO    2018/156910 A1    8/2018

OTHER PUBLICATIONS

International Search Report and Written Opinion, PCT/US2022/34064, dated Sep. 22, 2022, 9 pages.

(Continued)

*Primary Examiner* — Jinney Kil
(74) *Attorney, Agent, or Firm* — Nelson Mullins Riley & Scarborough LLP

(57) ABSTRACT

An irradiation target system having an irradiation target with at least one annular plate defining a central opening and including an elongated body, a flange portion, and a tab portion, wherein the flange portion extends beyond a first end of the plurality of plates, a target debundling tool, having a base plate, a gripper assembly affixed to the base plate, and a twister assembly including a housing defining a target bore configured to receive the target therein, and a slide portion that is slidably and non-rotatably mounted to the housing at a bottom end of the target bore.

21 Claims, 10 Drawing Sheets

(56) References Cited

U.S. PATENT DOCUMENTS

| | | | |
|---|---|---|---|
| 2013/0301769 A1* | 11/2013 | Schaffer | B22F 1/145 |
| | | | 376/195 |
| 2014/0348284 A1* | 11/2014 | Diamond | G21G 1/06 |
| | | | 376/202 |
| 2017/0048962 A1 | 2/2017 | Triumf | |
| 2017/0243666 A1* | 8/2017 | Khajeali Chaleshtori | ............... |
| | | | G21K 5/08 |
| 2018/0322973 A1 | 11/2018 | Fisher et al. | |
| 2019/0043630 A1 | 2/2019 | Fisher et al. | |
| 2020/0027618 A1* | 1/2020 | Onderwater | G21C 23/00 |
| 2020/0090824 A1 | 3/2020 | Onderwater et al. | |

OTHER PUBLICATIONS

International Search Report and Written Opinion, PCT/US2022/34046, dated Sep. 21, 2022, 7 pages.

* cited by examiner

IRRADIATION TARGETS FOR THE PRODUCTION OF RADIOISOTOPES AND DEBUNDLING TOOL FOR DISASSEMBLY THEREOF

CLAIM OF PRIORITY

This application claims priority to U.S. Provisional Patent Application No. 63/344,391 filed May 20, 2022, and the benefit of U.S. Provisional Patent Application No. 63/212,177 filed Jun. 18, 2021, the entire disclosures of which are incorporated herein.

TECHNICAL FIELD

The presently-disclosed invention relates generally to titanium-molybdate-99 materials suitable for use in technetium-99m generators (Mo-99/Tc-99m generators) and, more specifically, to irradiation targets used in the production of those titanium-molybdate-99 materials and a debundling tool for disassembly of the irradiation targets.

BACKGROUND

Technetium-99m (Tc-99m) is the most commonly used radioisotope in nuclear medicine (e.g., medical diagnostic imaging). Tc-99m (m is metastable) is typically injected into a patient and, when used with certain equipment, is used to image the patient's internal organs. However, Tc-99m has a half-life of only six (6) hours. As such, readily available sources of Tc-99m are of particular interest and/or need in at least the nuclear medicine field.

Given the short half-life of Tc-99m, Tc-99m is typically obtained at the location and/or time of need (e.g., at a pharmacy, hospital, etc.) via a Mo-99/Tc-99m generator. Mo-99/Tc-99m generators are devices used to extract the metastable isotope of technetium (i.e., Tc-99m) from a source of decaying molybdenum-99 (Mo-99) by passing saline through the Mo-99 material. Mo-99 is unstable and decays with a 66-hour half-life to Tc-99m. Mo-99 is typically produced in a high-flux nuclear reactor from the irradiation of highly-enriched uranium targets (93% Uranium-235) and shipped to Mo-99/Tc-99m generator manufacturing sites after subsequent processing steps to reduce the Mo-99 to a usable form. Mo-99/Tc-99m generators are then distributed from these centralized locations to hospitals and pharmacies throughout the country. Since Mo-99 has a short half-life and the number of production sites are limited, it is desirable to minimize the amount of time needed to reduce the irradiated Mo-99 material to a useable form.

There at least remains a need, therefore, for a process for producing a titanium-molybdate-99 material suitable for use in Tc-99m generators in a timely manner.

SUMMARY OF INVENTION

One embodiment of the present invention provides an irradiation target system for the production of radioisotopes, having an irradiation target, including a plurality of annular plates defining a central opening, and a first elongated central member passing through the central opening of the plurality of annular plates so that the plurality of annular plates is retained thereon, the first elongated central member including an elongated body, a flange portion extending transversely thereto at a first end, and a tab portion extending axially therefrom at a second end, wherein the flange portion of the first elongated central member extends axially outwardly beyond a first end of the plurality of plates and the tab portion extends axially outwardly beyond a second end of the plurality of plates, a target debundling tool, having a base plate, a gripper assembly affixed to the base plate, a twister assembly rotatably secured to the base plate, the twister assembly comprising a housing defining a target bore that is configured to receive the irradiation target therein, and a slide portion that is slidably and non-rotatably mounted to the housing at a bottom end of the target bore, the slide portion defining a first aperture that is substantially circular and has a maximum diameter that is less than the outer diameter of the plurality of annular plates of the irradiation target.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

Figure 1A:
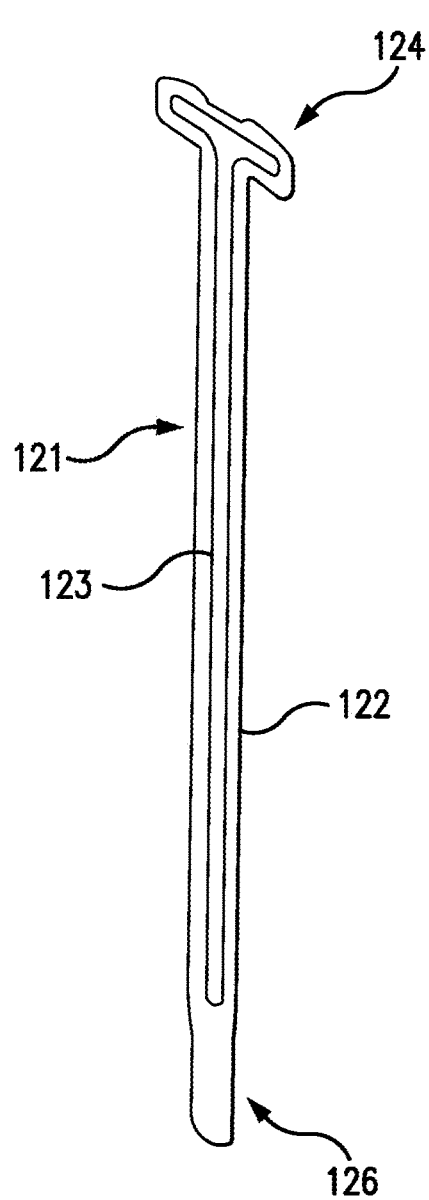
FIGS. 1A and 1B are a perspective view and a front view of a retaining clip, respectively, that form a rigid spine of an irradiation target in accordance with an embodiment of the present invention.

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

As used herein, terms referring to a direction or a position relative to the orientation of the irradiation target debundling tool, such as but not limited to "vertical," "horizontal,"

Figure 6A:
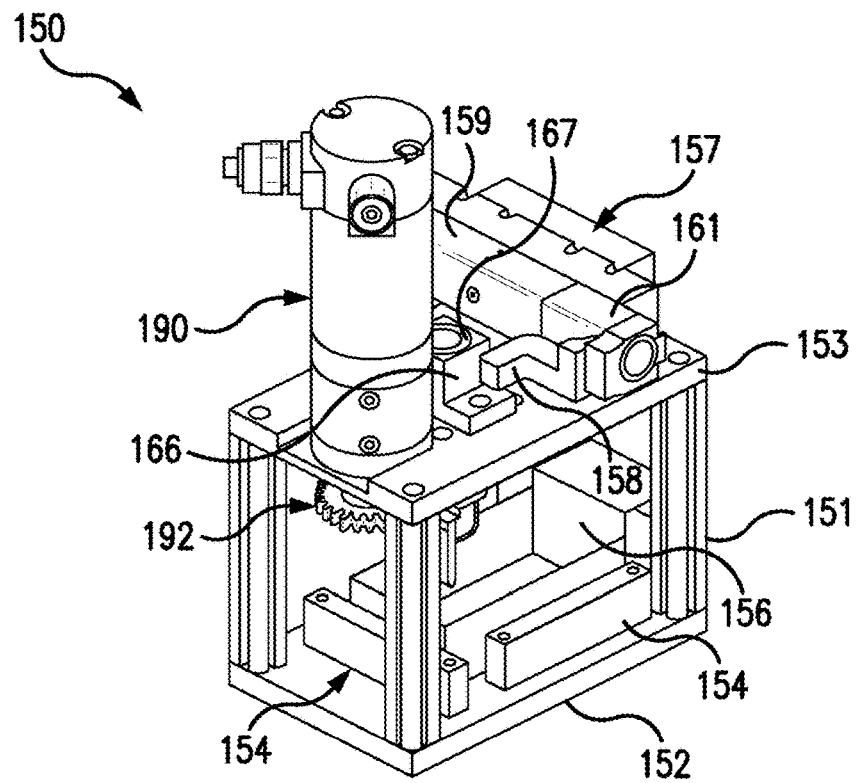
FIGS. 6A, 6B, 6C, and 6D are perspective, top, front, and left side views of a debundling tool in accordance with an embodiment of the present invention.
Figure 6B:
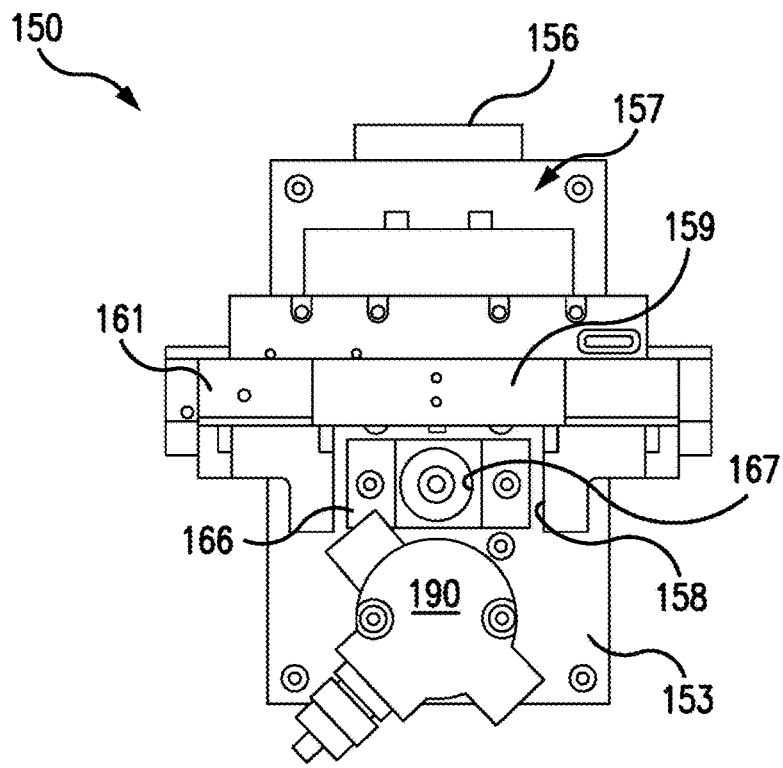

"top," "bottom," "above," or "below," refer to directions and relative positions with respect to the irradiation target debundling tool orientation shown in FIGS. 6A and 6B. Thus, for instance, the terms "vertical" and "top" refer to the vertical orientation and relative upper position in the perspective of FIGS. 6A and 6B, and should be understood in that context, even with respect to an irradiation target debundling tool that may be disposed in a different orientation.

Further, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "and" as used in this application and the appended claims should generally be construed to mean "one or more" unless specified otherwise or clear from the context to be directed to a singular form. Throughout the specification and claims, the following terms takes at least the meanings explicitly associated herein, unless the context dictates otherwise. The meanings identified below do not necessarily limit the terms, but merely provide illustrative examples for the terms. The meaning of "a," "and," and "the" may include plural references, and the meaning of "in" may include "in" and "on." The phrase "in one embodiment," as used herein, does not necessarily refer to the same embodiment, although it may.

Figure 1B:
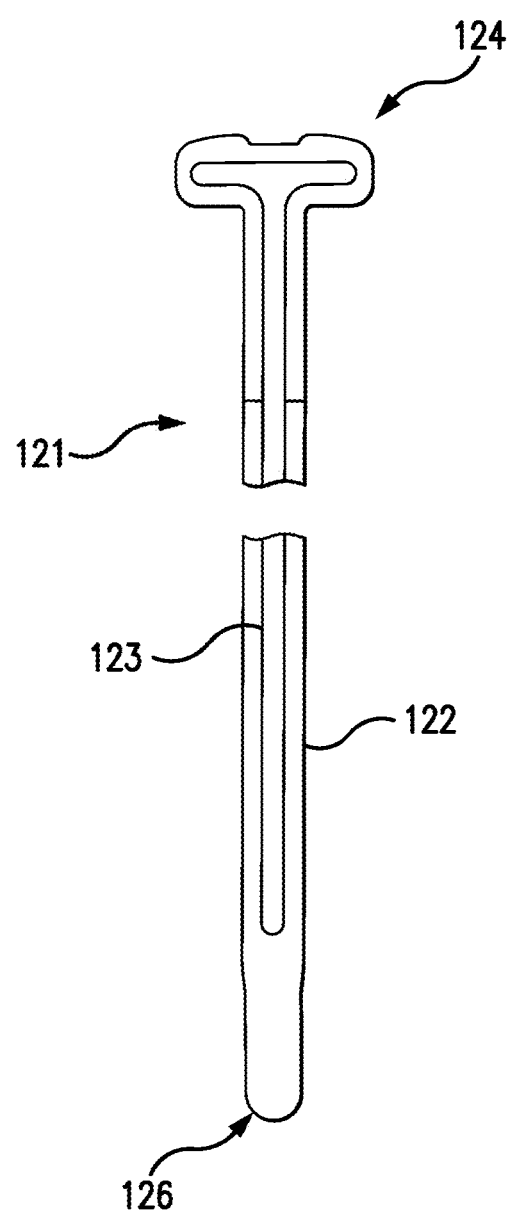
Figure 2:
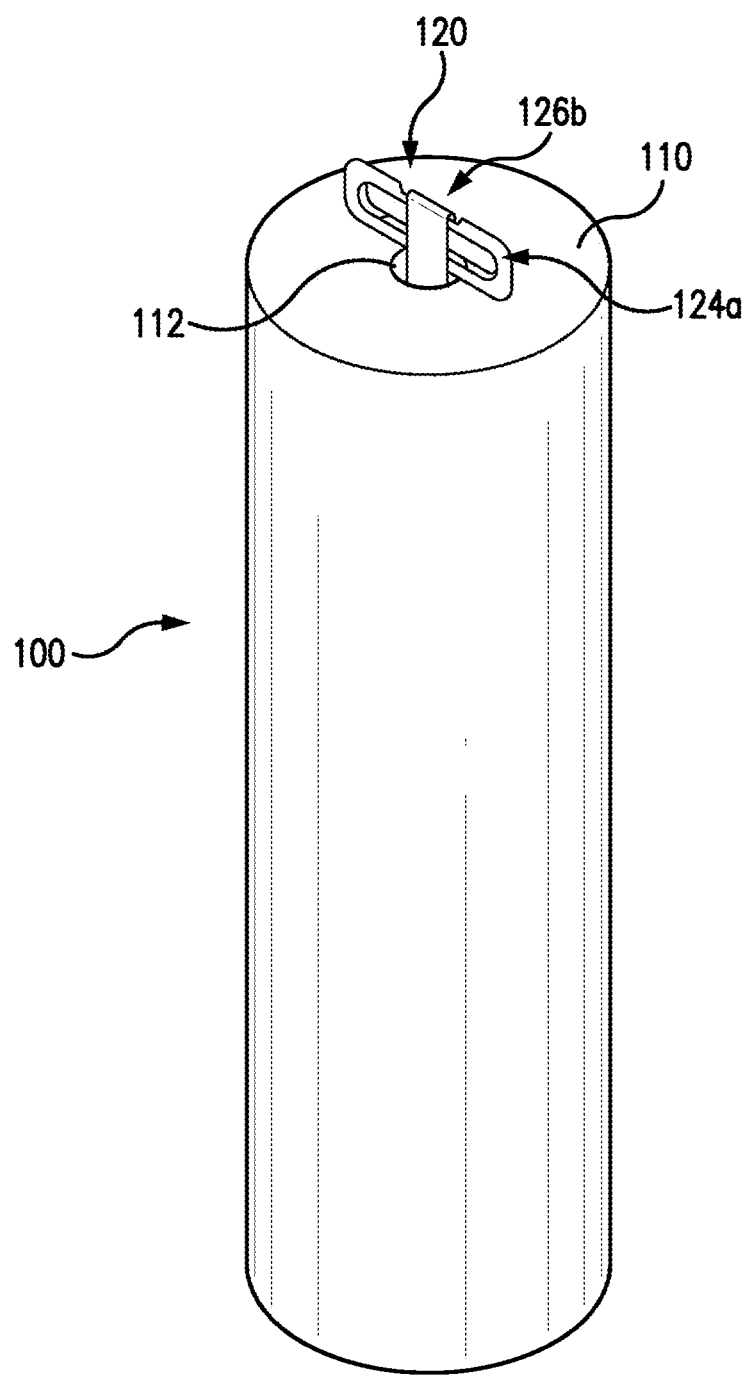
FIG. 2 is a side perspective view of an irradiation target in accordance with an embodiment of the present invention.

Referring now to FIGS. 1A, 1B, and 2, an irradiation target 100 in accordance with the present invention includes a plurality of thin annular plates 110 that are retained on a rigid spine 120 formed by a pair of retaining clips 121a and 121b, which are in turn slidably received in an outer canister 102. Preferably, both the plurality of thin annular plates 110 and retaining clips 121a and 121b are formed from the same material, the material being one that is capable of producing the isotope molybdenum-99 (Mo-99) after undergoing a neutron capture process in a nuclear reactor, such as a fission-type nuclear reactor. In the preferred embodiment, this material is Mo-98. Note, however, in alternate embodiments, plates 110 and retaining clips 121a and 121b may be formed from materials such as, but not limited to, Molybdenum Lanthanum (Mo—La), Titanium Zirconium Molybdenum (Ti—Zr—Mo), Molybdenum Hafnium Carbide (Mo Hf—C), Molybdenum Tungsten (Mo—W), Nickel Cobalt Chromium Molybdenum (Mo-MP35N), and Uranium Molybdenum (U—Mo).

As shown in FIG. 2, the rigid spine 120 is formed by a first retaining clip 121a and a second retaining clip 121b, the two clips being identical in structure. As such, each clip includes an elongated body 122, that is substantially planar, a flange portion 124 at a first end of the elongated body, and a tab portion 126 at a second end of the elongated body 122. Note, in FIGS. 1A and 1B the tab portion 126 of the retaining clip 121 is shown in the un-folded position. Prior to assembly of the spine 120, the tab portion 126 of each retaining clip 121 extends axially-outwardly from the end of the corresponding elongated body 122. Preferably, the elongated body 122 of each clip includes a rib portion 123 that extends the length of the elongated body 122, with the exception of the tab portion 126, to lend rigidity to the clips 121 while allowing the tab portions 126 to be readily bent. As well, the rib portion 123 is present on the flange portion 124 of the retaining clip 121 to increase rigidity thereof.

In the discussed embodiment, the elongated body 122 of the retaining clip 121 has a length that is slightly greater than the overall length of the plurality of thin plates 110 of irradiation target 100. The maximum width of the elongated body 122 allows the end of the retaining clip 121 that includes tab portion 126 to be slid through the bore 111 defined by the plurality of thin plates 110 during the assembly process, as discussed in greater detail below.

The majority of the mass of the irradiation target 100 lies in the plurality of thin plates 110 that are slidably received on the rigid spine 120. Preferably, each thin plate 110 is a thin annular disk, although alternate shapes other than circular are possible. The reduced thickness of each annular plate 110 provides an increased surface area for a given amount of target material. The increased surface area of each thin plate 110 facilitates the process of dissolving the plates after they have been irradiated in a fission reactor as part of the process of producing Ti—Mo-99. Additionally, for the preferred embodiment, each thin plate 110 defines a central aperture 112 so that each thin plate 110 may be slidably positioned on rigid spine 120.

Figure 4:
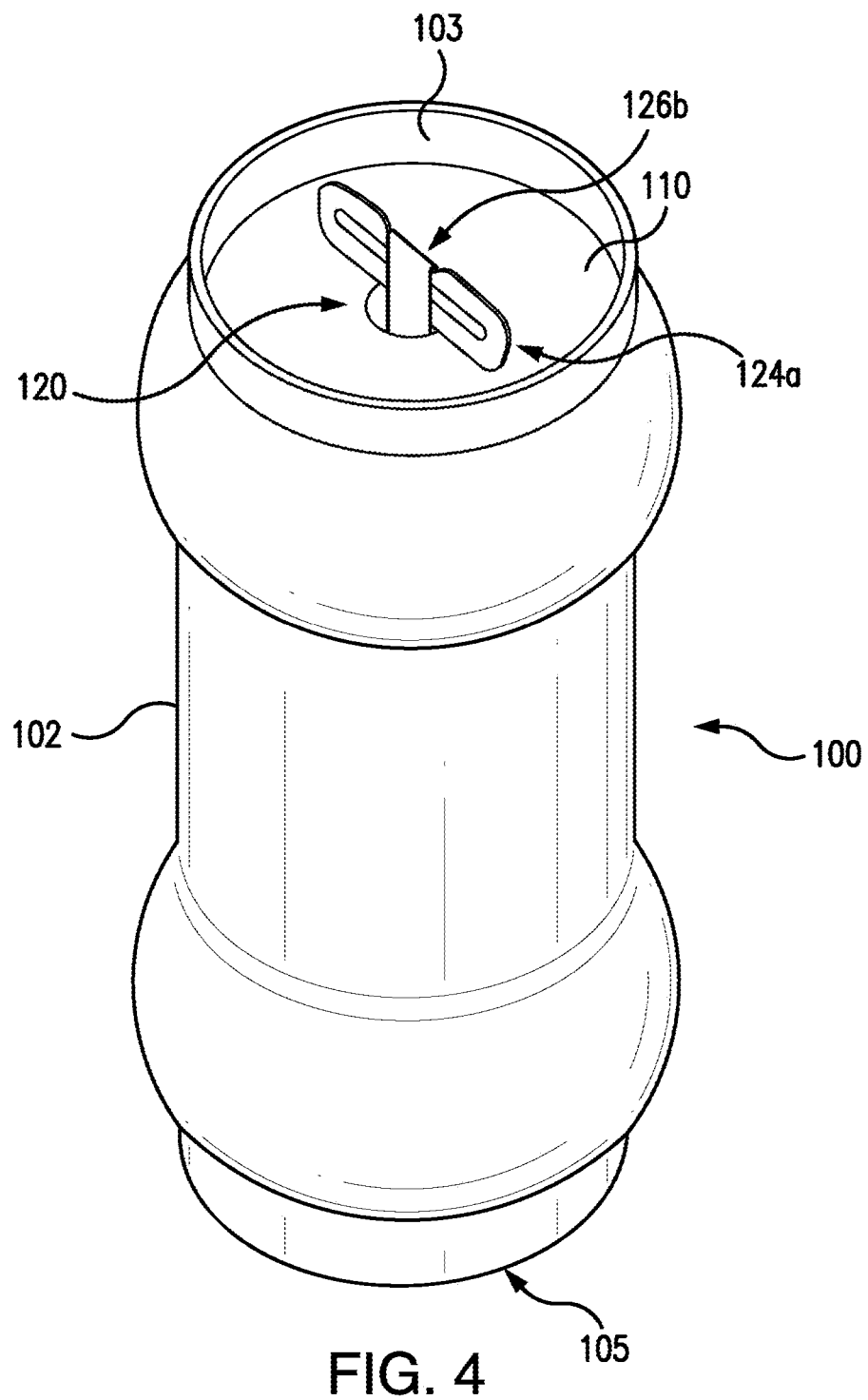
FIG. 4 is a perspective view of the irradiation target shown in FIG. 2 loaded in a corresponding target cannister with one of the end caps removed.
Figure 5:
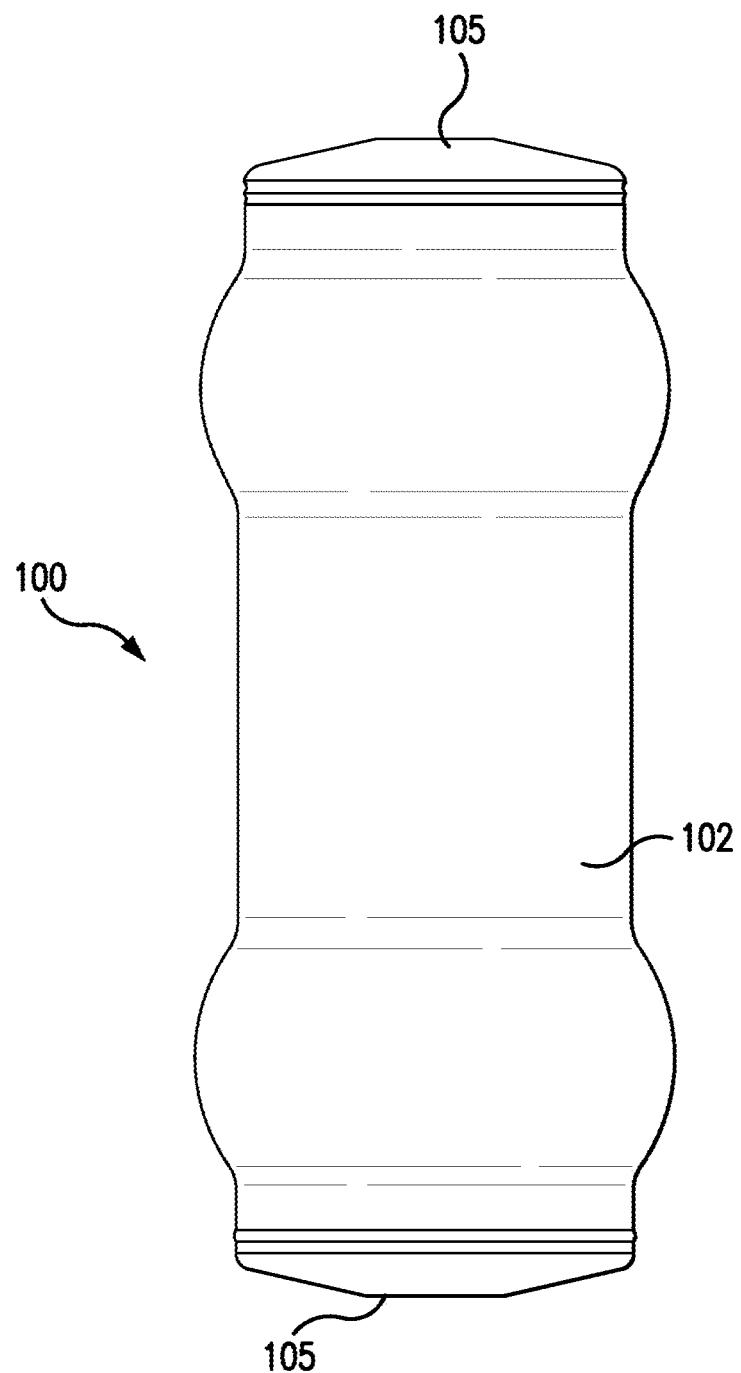
FIG. 5 is a side view of the target cannister shown in FIG. 4 with both end caps affixed thereto.

In the present embodiment, a target canister 102 is utilized to insert an irradiation target 100 into a fission nuclear reactor during the irradiation process. As best seen in FIGS. 4 and 5, each target canister 102 includes a substantially cylindrical body portion that defines an internal bore 103. The bore 103 is sealed by end caps 105 so that the thin plates 110 of the irradiation target remain in a dry environment during the irradiation process within the corresponding reactor. Keeping thin plates 110 of the targets dry during the irradiation process prevents the formation of oxide layers thereon, which can hamper efforts to dissolve the thin plates in subsequent chemistry processes to reduce the Mo-99 to a usable form.

Figure 3:
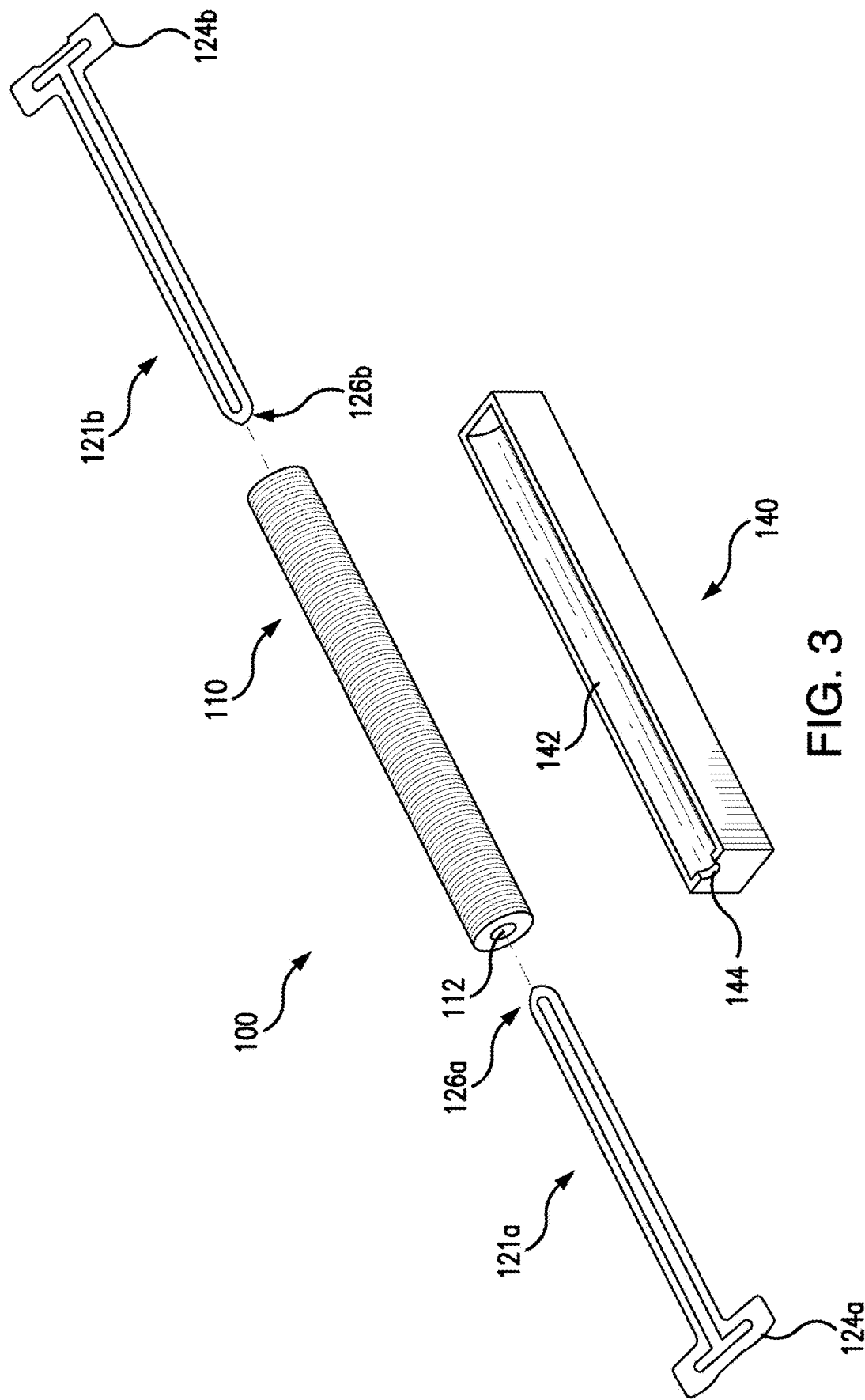
FIG. 3 is a view of the assembly process of the irradiation target shown in FIG. 2.

Referring now to FIG. 3, the assembly process of the irradiation target 100 is discussed. First, a plurality of thin plates 110, preferably annular plates, is positioned in a semi-cylindrical recess 142 of an alignment jig 140. The alignment jig 140 may be formed by a 3-D printing process and the plurality of plates are tightly packed in semi-cylindrical recess 142 so that their central apertures 112 are in alignment. A front end having the tab portion 126a of the first retaining clip 121a is inserted into the central bore 111 of the plurality of plates 110 that are tightly packed in alignment jig 140. A semi-circular recess 144 is provided in an end wall of alignment jig 140 so that the first retaining clip 121a may be aligned with the central bore 111. The first retaining clip 121a is inserted until the bottom surfaces of its flange portion 124a come into abutment with the plurality of annular plates 110. After the first retaining clip 121a is fully inserted in the plurality of annular plates 110, the tab portion 126a extends outwardly beyond the end of the stack of annular plates.

Next, the tab portion 126b second retaining clip 121b is inserted into the end of the central bore 111 from which the flange portion 124a of the first retaining clip 121a extends. As shown in FIG. 2, the first and second retaining clips 121a and 121b are disposed within the central bore of the plurality of annular plates 110 so that their elongated bodies 122a and 122b are nested together. Similarly to the first retaining clip 121a, the second retaining clip 121b is slidably inserted into the bore of the annular plates 110 until the bottom surfaces of its flange portion 124b abuts the outer surface of the outermost annular plate 110. In this position, the tab portion 126b of the second retaining clip 120b extends axially-outwardly beyond the flange portion 124a of the first retaining clip 121a. As shown in FIG. 2, the tab portions 126a and 126b of the first and second retaining clips 121a and 121b are folded over the flange portions 124a and 124b of the other retaining clip, thereby retaining the plurality of annular plates 110 between the flange portions 124a and 124b of first and second retaining clips 121a and 121b.

Figure 6C:
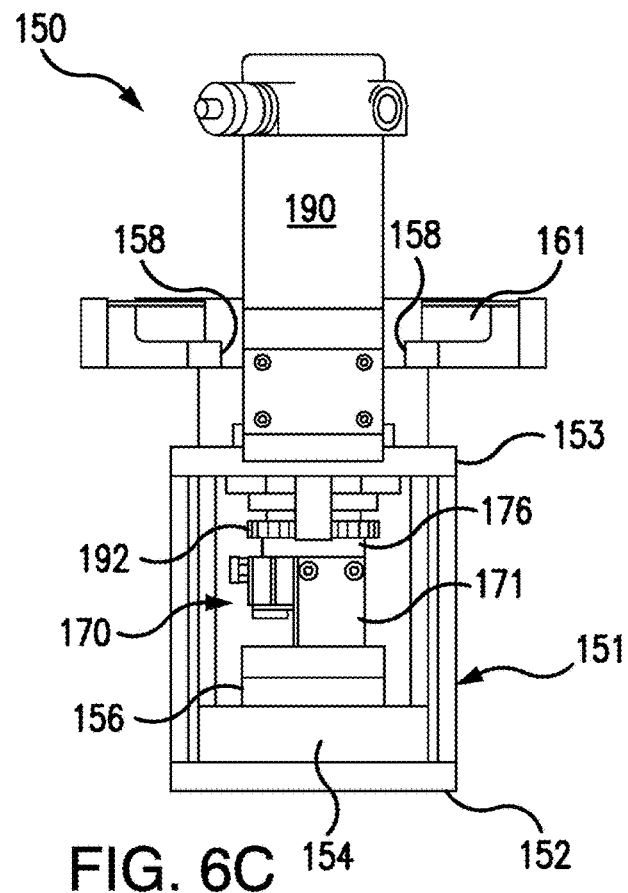
Figure 6D:
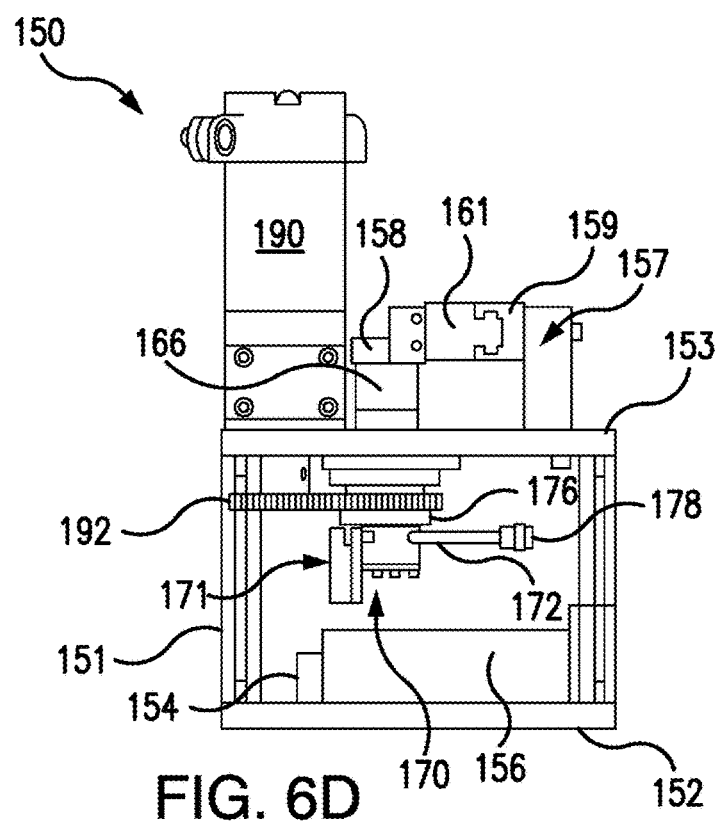

After irradiation of the target canister 102 and removal of the plurality of annular plates 100 therefrom, the rigid spine 120 is removed to allow for further processing of the annular plates 110. Referring now to FIGS. 6A through 6D, an irradiation target debundling tool 150 is preferably used to remove the flange portion 124 from one end of the rigid spine 120 of a corresponding irradiation target 100 so that the plurality of annular plates 110 may be slidably removed from the rigid spine 120 for processing. As shown, the debundling tool 150 preferably includes a top plate 153 that is supported above a base plate 152 by a plurality of posts 151. As best seen in FIGS. 6C and 6D, the twister assembly 170 is secured to the bottom surface of the top plate 153 of the debundling tool 150. A slide portion 172 that is slidably supported within a housing 176 of the twister assembly, and is movable between multiple positions as discussed in greater detail below. As best seen in FIG. 6A, a removable drawer 156 is disposed beneath the twister assembly 170 and is held in position on the base plate 152 by a plurality of rails 154. The drawer 156 is configured to receive the loose annular plates 110 and portions of the rigid spine 120 that fall from the twister assembly 170 as the irradiation target 100 is debundled.

Still referring to FIGS. 6A through 6D, the debundling tool 150 includes a gripper assembly 157 secured to a top surface of the top plate 153. Preferably, the gripper assembly 157 is pneumatically operated and includes a gripper mount block 159 and a pair of gripper arms 161 that are movably supported by the gripper mount block 159. Each gripper arm 161 includes a gripper 158 disposed thereon, with the gripper arms 161 being configured to move the opposed grippers 158 toward and away from each other as desired. A load tube 166 is vertically supported by the top plate 153 and defines a cylindrical target bore 167 therein that is configured to slidably receive an assembled irradiation target 100 therein after the irradiation target 100 has been irradiated and removed from the target canister 102. The length of the target bore 167 is selected such that when an irradiated target 100 is disposed therein, the flange portion 124 of the rigid spine 120 of the target extends upwardly beyond the top surface of the load tube 166 so that the flange portion 124 may be secured in place by the grippers 158. As well, an electric motor 190 is supported on the upper surface of top plate 153 and is configured to selectively drive a corresponding drive gear 192 that is mechanically linked to the electric motor 190 and disposed beneath the top plate 153.

Referring additionally to FIGS. 7A through 7D, the twister assembly 170 is shown in greater detail. As shown, a portion of the twister assembly housing 176 forms a portion of the previously mentioned load tube 166 so that a bottom end of a loaded irradiation target 100 extends below the top plate 153 and into the twister assembly 170. Note, the housing 176 of the twister assembly 170 is rotatable with respect to the top plate 153, and is supported from the top plate 153 by an internal bushing (not shown). The top surface 184 of the slide portion 172 defines the bottom end of the target bore 167 of the load tube 166 and may be used to selectively support the corresponding irradiation target 100 thereon, as discussed in greater detail below. The slide portion 172 includes a handle 171 on a first end thereof that permits a user to slide the slide portion 172 in a direction transverse to the housing 176 and, therefore, the load tube 166. A hard stop 178 is disposed at the opposite end of the slide portion 172 and prevents a user from inadvertently removing the slide portion 172 from the twister assembly 170.

Figure 8:
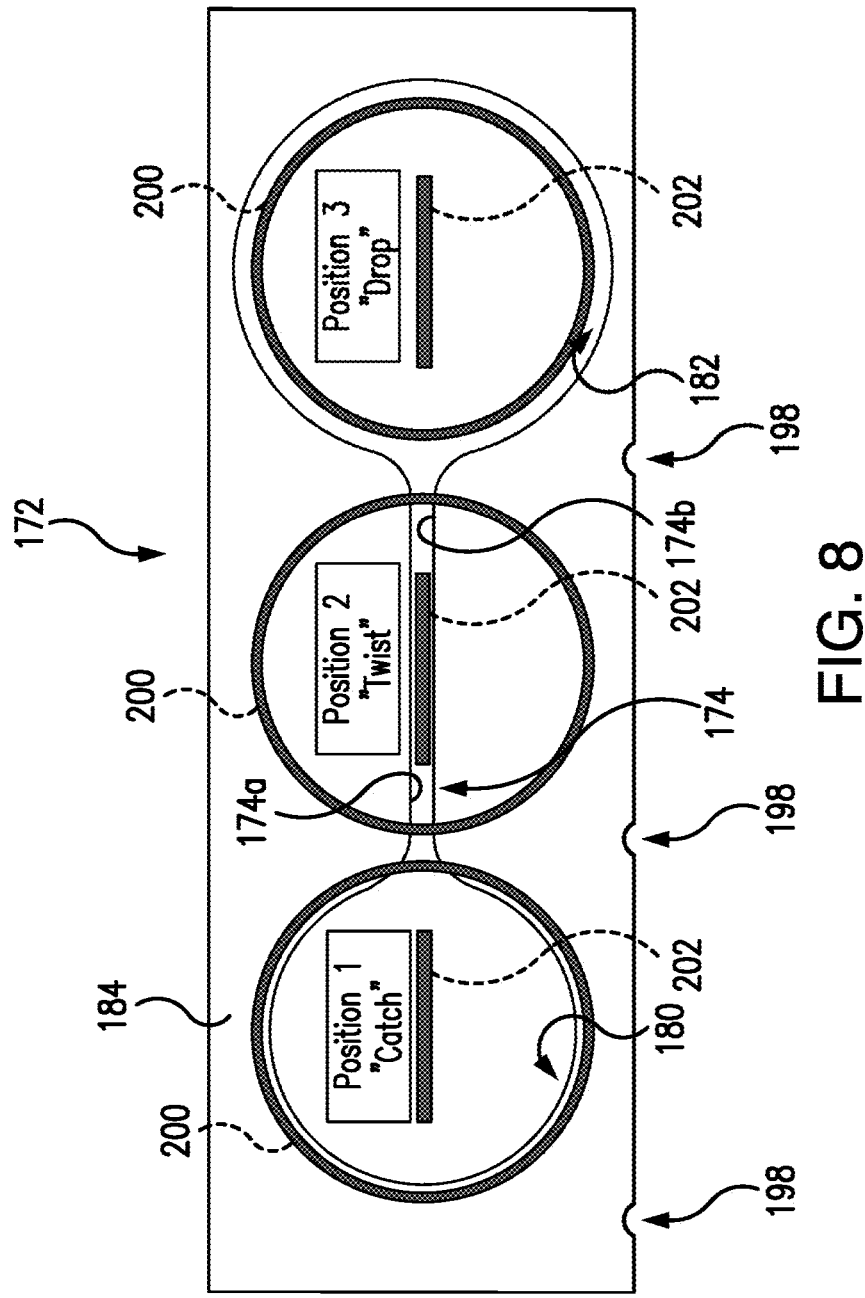
FIG. 8 is a top view of the slide portion of the twister assembly shown in FIGS. 7A through 7D.

A twist gear 177 extends radially-outwardly from the outer surface of the rotatable housing 176, the twist gear 177 being rotatably engaged by the drive gear 192 of the electric motor 190, as best seen in FIG. 6D. As such, the electric motor 190 may be used to selectively rotate the twist gear 177, and therefore housing 176, by way of drive gear 192. Referring additionally to FIG. 8, the slide portion 172 defines a catch aperture 180, a drop aperture 182, and a jaw aperture 174 extending therebetween. The catch aperture 180, the drop aperture 182, and the jaw aperture 174 are axially aligned along a longitudinal center axis of the slide portion 172. As shown, the catch aperture 180 and the drop aperture 182 of the slide portion 172 are substantially circular with the maximum diameter of the catch aperture 180 being slightly less than the outer diameter of the corresponding irradiated target 200, the circumference of which is shown in dotted lines at 200, whereas the outer diameter of the drop aperture 182 is slightly greater than the maximum diameter of the corresponding irradiated target, also shown in dotted lines at 200. As such, the catch aperture 182 prevents the passage of an irradiated target 200 through the slide portion 172 so that the irradiated target is supported on the slide portion 172, whereas the drop aperture 182 is configured to allow the passage of the irradiated targets therethrough. Note, the diameter of the catch aperture 180 is greater than the transverse length of the flange portion 124 of the spine such that the flange portion may pass through the catch aperture 180 regardless of the orientation of the target 100. As well, the jaw aperture 174 is formed by a pair of parallel side walls 174a and 174b that are configured to slidably receive the flange portion 202, shown in dotted lines at 202, of a corresponding target therebetween.

Figure 7A:
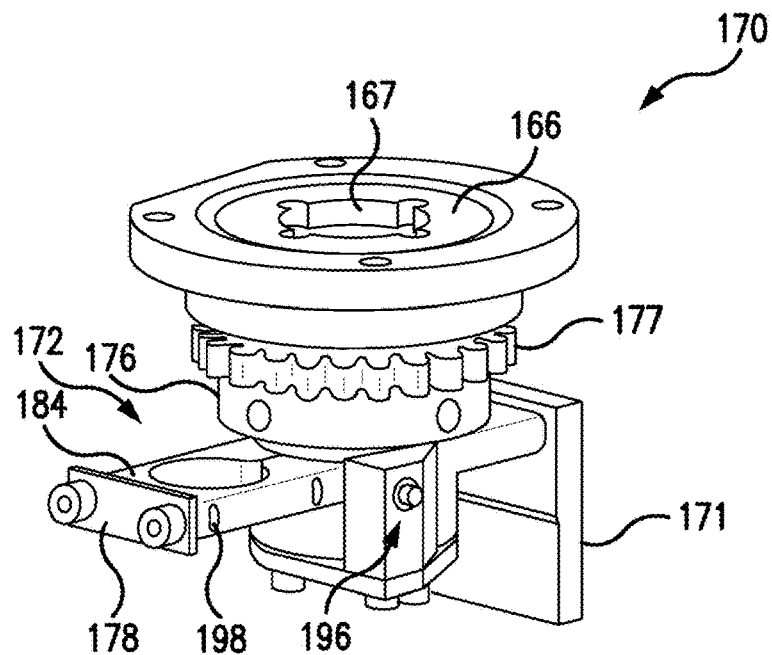
FIGS. 7A, 7B, 7C, and 7D are perspective, top, rear, and left side views of a twister assembly of the debundler tool shown in FIGS. 6A through 6D.
Figure 7B:
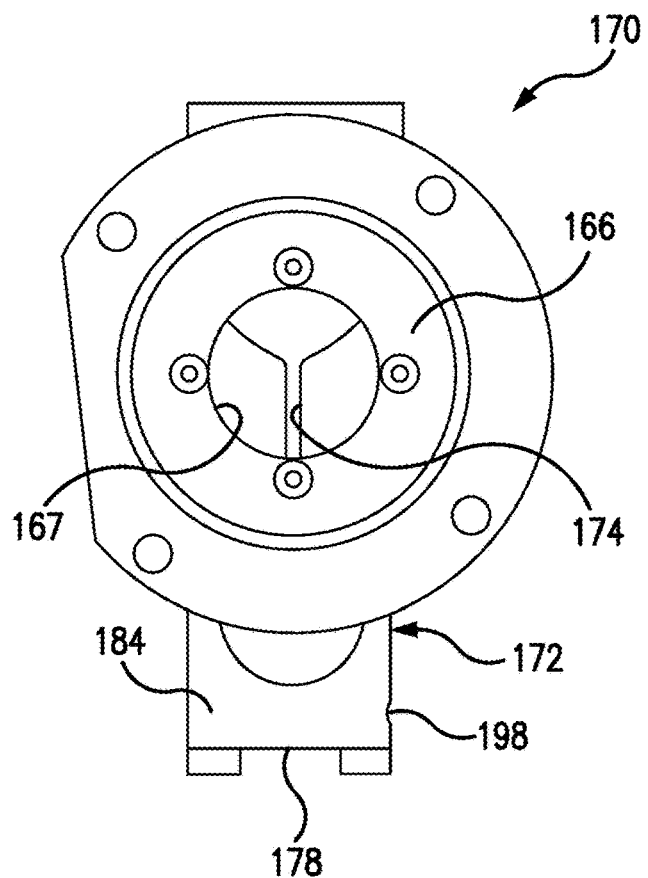
Figure 7C:
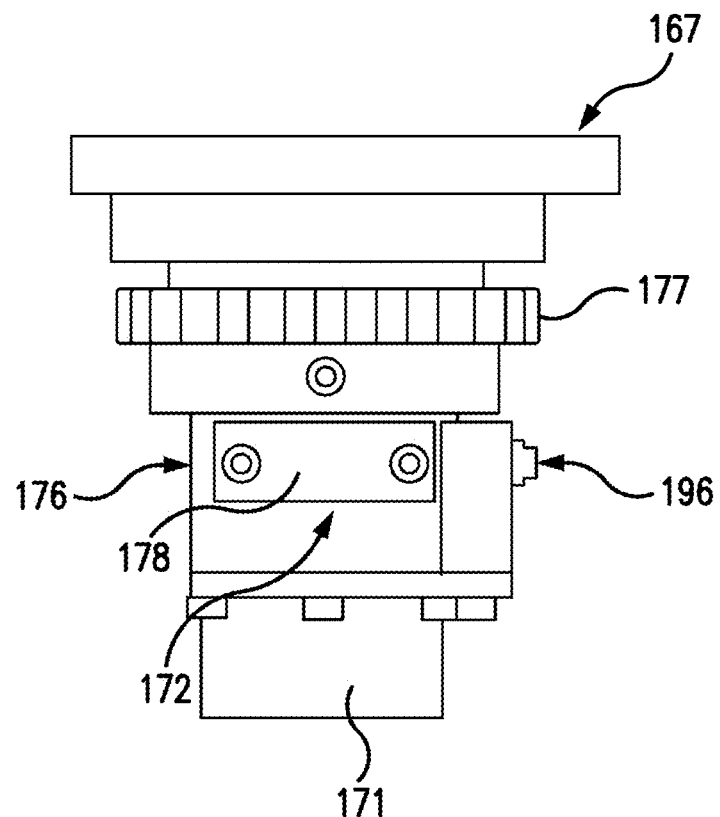
Figure 7D:
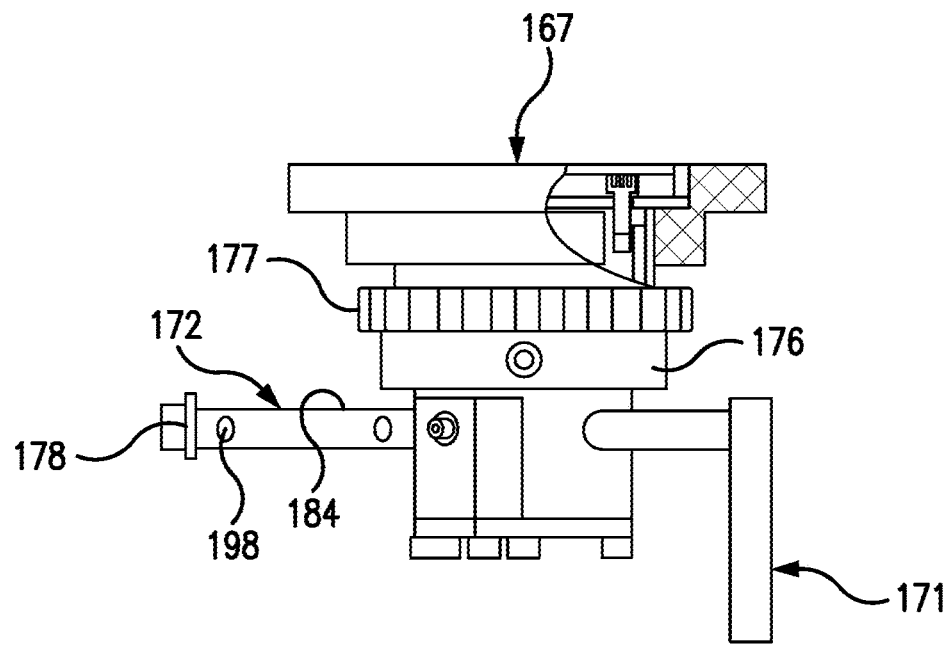

After an irradiation target 100 has been removed from the nuclear reactor, the irradiation target 100 is removed from the outer canister 102 by removing one of the end caps 105, as shown in FIG. 4. Prior to insertion of the irradiated target 100 into the debundling tool 150, the slide portion 172 of the twister assembly 170 is positioned so that the catch aperture 180, as best seen in FIG. 8, is positioned at the bottom end of the load tube 166. A ball and spring detent assembly 196, as best seen in FIGS. 7A and 7D, engages corresponding slots 198 formed in an edge of the slide portion 172 to retain the slide portion 172 in the desired position. The irradiated target 100 is slidably inserted into the target bore 167 of the debundling tool 150 until the plurality of thin plates 110 rests on the portion of the top surface 184 of the slide portion 172 that surrounds the catch aperture 180. Preferably, all interior surfaces of the debundling tool 150 that come into contact with the irradiated target 100 are formed of titanium to avoid material interface conflicts with the target and also avoid the possibility of introducing foreign material into the target 100 that could affect the end medical product. Next, the housing 176 of the twister assembly 170 is rotated until the parallel side walls 174a and 174b of the jaw aperture 174 are parallel to the gripping surfaces of the grippers 158. The grippers 158 are then urged inwardly until they engage the exposed flange portion 124 of the irradiation target 100, thereby preventing rotation of the upper portion of the rigid spine 120. Engaging the exposed flange portion with the grippers 158 also ensures that the flange portion 124 that is disposed at the bottom end of the irradiated target 100 is axially aligned with the jaw aperture 174, as shown in FIG. 8.

The slide portion 172 is now moved to a second position in which the bottom flange portion 124 of the irradiated target 100 is slidably received within the jaw aperture 174. Again, the ball and spring detent 196 retains the slide portion 172 in the desired position. The electric motor 190 is now energized, thereby rotating the housing 176 by way of rotation of the twist gear 177 by the drive gear 192. Rotation of the housing 176 of the twister assembly 170 with respect to the base plate 152 of the debundling tool 150 causes rotation of the bottom flange portion 124 of the irradiation target 100 with respect to the top flange portion 124. After enough rotations of the housing 176, typically four to six rotations, the rigid spine 120 mechanically fails and the loose portions of the broken spine fall through the jaw aperture 174 into the drawer 156 below. With the bottom flange 124 removed, the slide portion 172 is now moved to a third position in which the drop aperture 182 is disposed below the irradiated target 100. As shown in FIG. 8, the diameter of the drop aperture 182 is greater than that of the plates 110 of irradiated target, thereby allowing the thin plates 110 to pass through the drop aperture 182 into the drawer 156 below. The top flange 124 of the irradiated target 100 is released by retracting the grippers 158 so that the top flange 124 may also fall into the drawer 156. The now debundled radiated target is ready for further processing.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. An irradiation target system for the production of radioisotopes, comprising:
   an irradiation target, comprising:
      a plurality of annular plates defining a central opening; and
      a first elongated central member passing through the central opening of the plurality of annular plates so that the plurality of annular plates is retained thereon, the first elongated central member including a first elongated body extending along a longitudinal center axis, a first flange extending transversely to the first elongated body at a first end of the first elongated body, and a first tab extending from a second end of the first elongated body, wherein the first flange of the first elongated central member extends axially outwardly beyond a first end of the plurality of annular plates and the first tab extends axially outwardly beyond a second end of the plurality of annular plates;
   a target debundling tool, comprising:
      a base plate;
      a gripper assembly affixed to the base plate;
      a twister assembly rotatably secured to the base plate, the twister assembly comprising a housing defining a target bore that is configured to receive the irradiation target therein, and a slide portion that is slidably and non-rotatably mounted to the housing at a bottom end of the target bore, the slide defining a first aperture that has a maximum diameter that is less than an outer diameter of the plurality of annular plates of the irradiation target, wherein the twister assembly is configured to engage and twist the first elongated central member of the irradiation target such that the irradiation target is debundled.

2. The irradiation target system of claim 1, wherein the plurality of annular plates and the first elongated central member are both formed of materials that produce molybdenum-99 (Mo-99) by way of neutron capture.

3. The irradiation target system of claim 1, wherein the first elongated central member further comprises a rib that extends both outwardly from the first elongated body and along the longitudinal center axis of the first elongated body.

4. The irradiation target system of claim 1, wherein the irradiation target further comprises a second elongated central member passing through the central opening of the plurality of annular plates, the second elongated central member including a second elongated body, a second flange extending transversely from a first end of the second elongated body of the second elongated central member and a second tab extending from a second end of the second elongated body, wherein the first tab of the first elongated central member is adjacent the second flange of the second elongated central member.

5. The irradiation target system of claim 4, wherein the first tab of the first elongated central member forms a fold over the second flange of the second elongated central member.

6. The irradiation target system of claim 4, wherein each plate of the plurality of annular plates, the first elongated central member, and the second elongated central member are each formed of molybdenum-98 (Mo-98).

7. The irradiation target system of claim 4, wherein when the irradiation target is disposed within the target bore, the gripper assembly is configured to engage the first flange of the first elongated central member such that the irradiation target is non-rotatable with respect to the twister assembly.

8. The irradiation target system of claim 7, wherein the slide of the twister assembly further defines a second aperture extending though the slide that is defined by two parallel side walls extending through the slide, the second aperture being configured to slidably receive the second flange of the second elongated central member therein.

9. The irradiation target system of claim 8, wherein the slide is slidable between a first position in which the first aperture is disposed at a bottom of the irradiation target and a second position in which the second aperture is disposed at the bottom of the irradiation target.

10. The irradiation target system of claim 9, wherein the slide further defines a third aperture that has a minimum diameter that is greater than the outer diameter of at least one of the plurality of annular plates of the irradiation target, and is slidable to a third position in which the third aperture is disposed at the bottom of the irradiation target.

11. An irradiation target system for the production of radioisotopes, comprising:
   an irradiation target, comprising:
      a plurality of annular plates defining a central opening; and
      a first elongated central member passing through the central opening of the plurality of annular plates so that the plurality of annular plates is retained thereon, the first elongated central member including a first elongated body extending along a longitudinal center axis, a first flange extending transversely to the first elongated body at a first end of the first elongated body, and a first tab disposed at a second end of the first elongated body, wherein the first flange abuts a first end face of the plurality of annular plates and extends axially-outwardly therefrom, and the first tab extends outwardly beyond a second end face of the plurality of annular plates;

a target debundling tool, comprising:
   a base plate;
   a gripper assembly affixed to the base plate;
   a twister assembly secured to the base plate, the twister assembly comprising a rotatable housing defining a target bore that is configured to receive the irradiation target therein, and a slide portion that is slidably and non-rotatably mounted to the housing at a bottom end of the target bore,
   wherein the gripper assembly is configured to engage the first elongated central member of the irradiation target at a first end of the first elongated central member and the twister assembly is configured to engage the first elongated central member of the irradiation target at a second end of the first elongated central member, the twister assembly configured to twist the first elongated central member such that the irradiation target is debundled.

12. The irradiation target system of claim 11, wherein the irradiation target further comprises a second elongated central member passing through the central opening of the plurality of annular plates, the second elongated central member including a second elongated body, a second flange extending transversely from a first end of the second elongated body of the second elongated central member and a second tab extending from a second end of the second elongated body, wherein the first tab of the first elongated central member is adjacent the second flange of the second elongated central member.

13. The irradiation target system of claim 12, wherein the slide defines a first aperture that has a maximum diameter that is less than an outer diameter of the plurality of annular plates of the irradiation target, and the slide further defines a second aperture that is defined by two parallel side walls extending through the slide, the second aperture being configured to slidably receive the second flange of the second elongated central member therein.

14. The irradiation target system of claim 13, wherein the first elongated central member further comprises a rib that extends both outwardly from the first elongated body and along the longitudinal center axis of the first elongated body.

15. The irradiation target system of claim 13, wherein the slide is slidable between a first position in which the first aperture is disposed at a bottom of the irradiation target and a second position in which the second aperture is disposed at the bottom of the irradiation target.

16. The irradiation target system of claim 12, wherein the first tab of the first elongated central member forms a fold over the second flange of the second elongated central member.

17. The irradiation target system of claim 12, wherein each plate of the plurality of annular plates, the first elongated central member, and the second elongated central member are each formed of molybdenum-98 (Mo-98).

18. The irradiation target system of claim 12, wherein the first end of the first elongated central member includes the first flange, and wherein when the irradiation target is disposed within the target bore, the gripper assembly is configured to engage the first flange of the first elongated central member such that the irradiation target is non-rotatable with respect to the twister assembly.

19. The irradiation target system of claim 15, wherein the slide further defines a third aperture that has a minimum diameter that is greater than an outer diameter of at least one of the plurality of annular plates of the irradiation target, and is slidable to a third position in which the third aperture is disposed at the bottom of the irradiation target.

20. The irradiation target system of claim 11, wherein the plurality of annular plates and the first elongated central member are both formed of materials that produce molybdenum-99 (Mo-99) by way of neutron capture.

21. A method of debundling an irradiation target according to claim 1, the method comprising steps of:
   engaging the first end of the first elongated central member;
   engaging the second end of the first elongated central member;
   twisting the first elongated central member by rotating the second end of the first elongated central member with respect to the first end of the elongated central member until the first elongated central member fails such that the plurality of annular plates are debundled.

* * * * *